(12) United States Patent
Li et al.

(10) Patent No.: US 7,977,012 B2
(45) Date of Patent: Jul. 12, 2011

(54) METHOD OF COATING A SURFACE OF A FUEL CELL PLATE

(75) Inventors: Wen Li, El Segundo, CA (US); Ping Liu, Irvine, CA (US); Jennifer J. Zinck, Calabasas, CA (US); Chaoyin Zhou, Chino, CA (US); Tina T. Salguero, Encino, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 145 days.

(21) Appl. No.: 12/429,164

(22) Filed: Apr. 23, 2009

(65) Prior Publication Data

US 2010/0273095 A1    Oct. 28, 2010

(51) Int. Cl.
   *H01M 8/02*    (2006.01)
   *H01M 4/64*    (2006.01)
   *H01B 1/24*    (2006.01)
   *B05D 5/12*    (2006.01)

(52) U.S. Cl. ........ 429/518; 429/521; 429/535; 252/506; 427/115

(58) Field of Classification Search .................. 429/210, 429/528, 535, 518, 530; 427/115, 343; 252/519.33, 252/519.34, 519.3; 428/447
   See application file for complete search history.

(56) References Cited

U.S. PATENT DOCUMENTS

| | | | |
|---|---|---|---|
| 5,223,081 A * | 6/1993 | Doan | 438/703 |
| 5,356,936 A * | 10/1994 | Howell et al. | 521/27 |
| 6,187,464 B1 * | 2/2001 | Yasumoto et al. | 429/13 |
| 2001/0021470 A1 * | 9/2001 | May et al. | 429/44 |
| 2004/0053060 A1 * | 3/2004 | Roziere et al. | 428/447 |
| 2006/0194095 A1 | 8/2006 | Vyas et al. | |
| 2006/0216571 A1 | 9/2006 | Vyas et al. | |
| 2007/0003813 A1 | 1/2007 | Vyas et al. | |
| 2007/0031721 A1 | 2/2007 | Winter et al. | |
| 2007/0117003 A1 | 5/2007 | Abd Elhamid et al. | |
| 2007/0178357 A1 | 8/2007 | Vyas et al. | |
| 2008/0076004 A1 | 3/2008 | Rodak et al. | |
| 2008/0124587 A1 | 5/2008 | Kisailus et al. | |

OTHER PUBLICATIONS

Wahab et al., "Functionalized periodic mesoporous organosilica fibers with longitudinal pore acrhitectures under basic conditions", Microporous and Mesoporous Materials, 92, 2006, p. 201-211.*

Sayari et al., "New insights into the synthesis, morphology, and growth of periodic mesoporous organosilicas", Chem. Materials, 2000, 12, p. 3857-3863.*

* cited by examiner

*Primary Examiner* — Jonathan Crepeau
*Assistant Examiner* — Kenneth Douyette
(74) *Attorney, Agent, or Firm* — Dierker & Associates, P.C.

(57) ABSTRACT

A method of coating a surface of a fuel cell plate is disclosed herein. The method involves forming a sol gel mixture including a metal oxide modified with at least one functional group, where the at least one functional group is configured to improve adhesion; and adding carbon modified with a hydrophilic functional group to the mixture, thereby forming a suspension. The suspension is applied to the surface of the fuel cell plate, and is activated to form a porous, hydrophilic, and conductive film on the surface of the fuel cell plate.

20 Claims, 2 Drawing Sheets

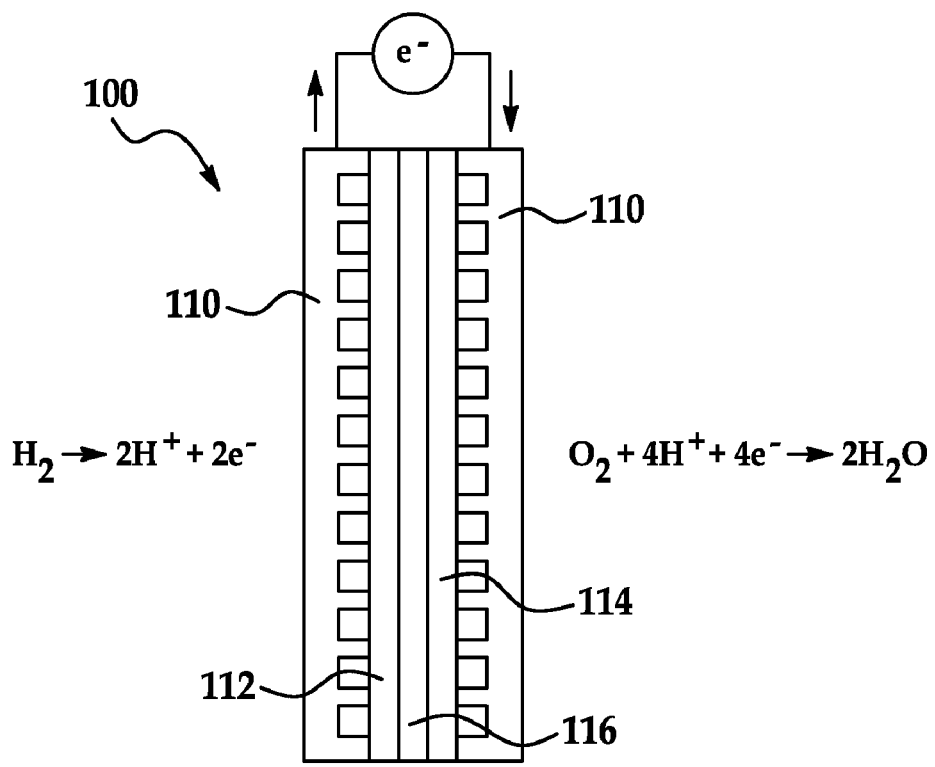
FIG. 1
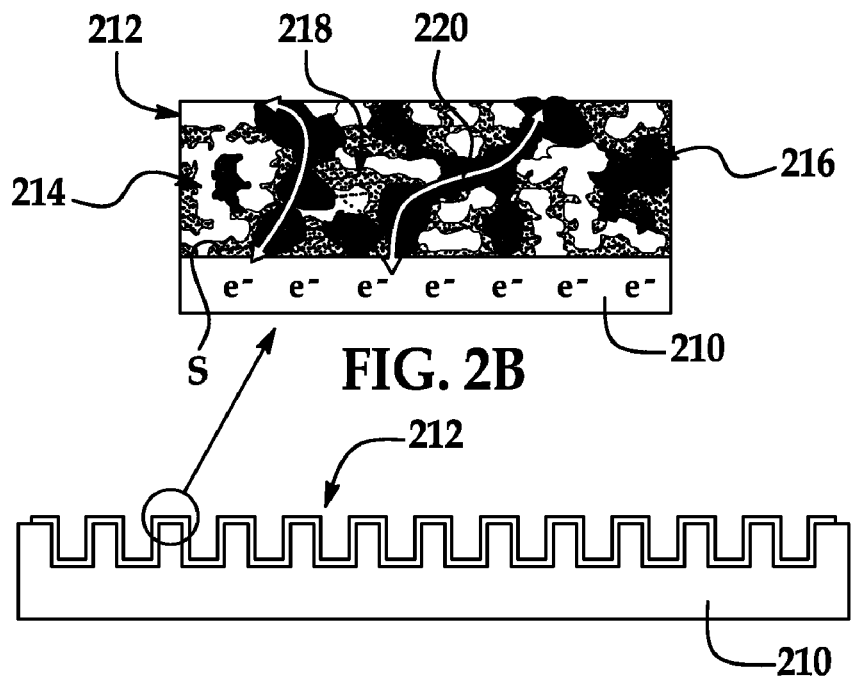
FIG. 2B
FIG. 2A

METHOD OF COATING A SURFACE OF A FUEL CELL PLATE

TECHNICAL FIELD

The present disclosure relates generally to fuel cells, and more particularly to a method of coating a surface of a fuel cell plate.

BACKGROUND

A bipolar plate is one component in a PEM (proton electrolyte membrane) fuel cell. The bipolar plate occupies about 80% of the total weight and constitutes 45% of the stack cost. The bipolar plate is generally configured to redistribute reactants uniformly over the active areas, remove heat from active areas, collect and carry current from one cell to another, and prevent leakage of reactants and coolants. In addition, the bipolar plates provide structural support to hold the fuel cell stack together. Yet another role of the bipolar plates is water management, i.e., to keep the MEA (membrane electrode assembly) humidified, yet not flooded.

SUMMARY

A method of coating a surface of a fuel cell plate is disclosed herein. The method involves forming a sol gel mixture including a metal oxide modified with at least one functional group, where the at least one functional group is configured to improve adhesion; and adding carbon modified with a hydrophilic functional group to the mixture, thereby forming a suspension. The suspension is applied to the surface of the fuel cell plate, and is activated to form a porous, hydrophilic, and conductive film on the surface of the fuel cell plate.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic cross-sectional view of an embodiment of a PEM fuel cell;

FIG. 2A is a schematic view of an embodiment of a coated bipolar plate;

FIG. 2B is an exploded view of the circled portion of FIG. 2A;

DETAILED DESCRIPTION

Figure 3:
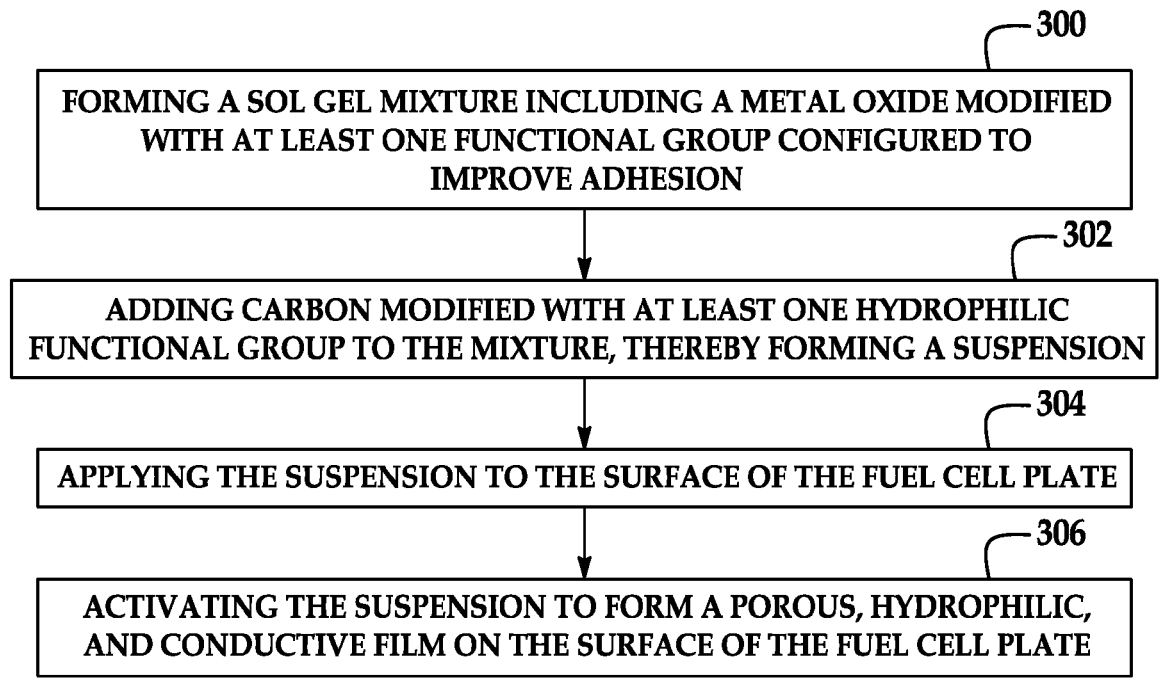
FIG. 3 is a flow diagram illustrating an embodiment of a method for forming an embodiment of a coating on a fuel cell plate.

During the operation of fuel cells, especially at low power demands, moisture in the form of droplets accumulates within the flow channels of the bipolar plate. The droplets continue to expand due to the typically hydrophobic nature of the channel surface, and as a result may block the passage of the reactant gases through the flow channels. Areas of the membrane deprived of the reactant gas will not generate electricity, which results in a reduction of the overall efficiency of the fuel cell, and in some instances, to the point of the failure. It has been found that a hydrophilic coating may be applied to the surface of the flow channel to improve channel water transport. Such a coating causes water to spread along its surface in a process of spontaneous wetting, and form a thin film. The thin film tends to cause less obstruction of the gas flow in the channels, and thus water is effectively transported along the channel toward the outlet by capillary forces.

Typical conductive coatings employed to reduce the contact resistance on a plate surface include relatively costly materials such as gold and its alloys, and composite polymeric materials, which require costly production equipment. Current hydrophilic coatings often include nanoparticulate silicas, or organic-based particles. However, these coatings are unstable over time, exhibit poor adhesion to the substrate material of the plate and are expensive to manufacture.

Embodiments of the metallic bipolar plate coating disclosed herein are conductive, and also advantageously have highly stable hydrophilicity. As such, beyond the traditional functions of bipolar plates, such as distributing reactants uniformly over the active areas, removing heat from the active areas, carrying current from cell to cell, and preventing leakage of reactants and coolant, the coating disclosed herein also improves water management for current PEM fuel cell systems. This, in turn, improves the performance and longevity of the fuel cell in which it is incorporated.

It is believed that the coating/film disclosed herein provides at least one notable advantage, namely robust hydrophilicity in a fuel cell environment due to improved chemical robustness (when compared to other hydrophilic coatings or non-coated bipolar plates). The improved chemical robustness is due, at least in part, to the use of both a modified metal oxide and a modified carbon. As previously mentioned, the hydrophilicity contributes to water management in a PEM fuel cell system. For example, the coating provides paths to quickly remove water, thereby reducing or preventing flooding. Furthermore, the conductivity of the coating prevents potential cell voltage drop, which may otherwise result when a coating layer is present on the bipolar plate(s).

Referring now to FIG. 1, a typical PEM fuel cell 100 is depicted. The fuel cell 100 includes an anode electrode layer 112, a proton exchange membrane 116, and a cathode electrode layer 114, all sandwiched between two bipolar plates 110.

In the fuel cell 100 disclosed herein, a coating (not shown in FIG. 1) is established on the bipolar plates 110. This coating is a layer containing modified metal oxide and modified carbon. The modified metal oxide is formed via a sol gel process, and includes one or more functional groups which improve the adhesion between the coating and the bipolar plate 110. The modified carbon includes one or more hydrophilic functional groups which improve the hydrophilicity of the coating.

FIG. 2A illustrates the bipolar plate 210 including the coating 212 thereon, and FIG. 2B is an enlarged view of a portion of the bipolar plate 210 and the coating 212. FIG. 3 illustrates an embodiment of the method for forming the coating 212.

Generally, the relatively low cost and simple coating process includes preparation of a sol gel and of a carbon-sol gel suspension, followed by deposition and activation of the suspension. More specifically (and as shown in FIG. 3), the method includes forming a sol gel mixture including a metal oxide modified with at least one functional group configured to improve adhesion, as shown at reference numeral 300, and adding carbon modified with at least one hydrophilic functional group to the mixture, thereby forming a suspension, as shown at reference numeral 302. The method further includes applying the suspension to the surface of the fuel cell plate, as shown at reference numeral 304, and activating the suspension to form a porous, hydrophilic, and conductive coating/film on the surface of the fuel cell plate, as shown at reference numeral 306. The embodiment of the method shown in FIG. 3 will be discussed further herein in reference to FIGS. 2A and 2B.

FIG. 2A illustrates the bipolar plate 210 for a PEM fuel cell 100 that is coated with an embodiment of the conductive, hydrophilic film 212. It is believed that the coating layer 212 utilizes cost-effective materials and enables a cost-effective approach for improving water management under PEM fuel cell conditions. The materials used to form the coating 212 include, but are not limited to, modified carbon 216 and modified metal oxides 214 formed via a sol gel process.

The modified carbon 216 is carbon (e.g., carbon black, graphite, carbon fibers, amorphous carbon, carbon nanotubes, graphene sheets, or combinations thereof) having one or more functional groups attached thereto. This particular functional group is believed to increase the hydrophilicity, adhesion, stability, and dispersability of the carbon 216 within the metal oxide-based sol gel solution. Non-limiting examples of the hydrophilic functional groups used to modify the carbon include sulfonic acid groups, phosphoric acid groups, and other organic acid groups (such as, for example, acetic acid groups, phenyl sulfonic acid (PSA) groups, and other groups described hereinbelow). Specific examples of the hydrophilic functional groups include one or more of: OR, COR, COOR, OCOR, COOM, halogen, CN, $NR_2$, SN, $SO_3H$, $SO_3M$, NR(COR), $CONR_2$, $NO_2$, $PO_3H_2$, $PO_3HM$, $NR_3^+X^-$, and $PR_3^+X^-$, where R is independently selected from H, C1-C20 alkyl, or aryl; n is an integer ranging from 1 to 8; M is a metal (Na, K, Li, etc); and X- is a halide anion or anion derived from a mineral or organic acid. The hydrophilic functional group may also be a hydrophilic organic group. Examples of hydrophilic organic groups are described by the following formula:

wherein:—represents the bond to the carbon component; and HG is a hydrophilic group. Examples of such hydrophilic groups include the previously listed groups. Depending upon the group, Ar may be absent or may be an aromatic group. Examples of suitable aromatic groups include phenyl, naphthyl, anthracenyl, phenanthrenyl, biphenyl, pyridinyl, benzyl, and the like. Specific examples of the hydrophilic organic groups include, but are not limited to, functional groups derived from a carboxylic acid, a benzenesulfonic acid, an alcohol, an amine, amide, poly(ethylene oxide), ethoxyl, methoxyl, phosphonic acid, naphthenesulfonic acid, salicylic acid, phenylphosphonic acid, benzoic acid, phthalic acid group, a salt of any of the above mentioned acids, and combinations thereof. In an embodiment, the functional group is phenyl sulfonic acid (PSA) group.

The metal oxides 214 used in the sol gel mixture include functional group(s) that is/are configured to improve the adhesion of the coating 212 to the bipolar plate 210. Such metal oxides 214 are selected from, as non-limiting examples, silicon dioxide, titanium dioxide, tin dioxide, tantalum oxide, hafnium dioxide, zirconium dioxide, niobium dioxide, molybdenum oxide, iridium oxide, ruthenium oxide, aluminum oxide, or mixtures thereof. The metal oxides 214 in the sol gel mixture are generated from a metal alkoxide precursor that includes the functional group(s). Non-limiting examples of such functional group(s) include amides, acrylics, epoxides, alkylureas, or combinations thereof.

The sol-gel process is a wet-chemical technique that utilizes a chemical solution or colloidal particles to produce an integrated network. In the embodiment disclosed herein, the metal alkoxide precursor undergoes hydrolysis and polycondensation reactions to form a colloid (i.e., a system composed of solid particles dispersed in a solvent). The sol then evolves towards the formation of an inorganic continuous network containing a liquid phase (gel). Formation of the metal oxide involves connecting the metal centers with oxo (M-O-M) or hydroxo (M-OH-M) bridges, thereby generating metal-oxo or metal-hydroxo polymers in solution. For example, the following reaction may be employed in the sol-gel synthesis of $TiO_2$-based material:

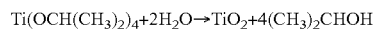

in which titanium isopropoxide reacts with water to deposit titanium dioxide. In another non-limiting example, the sol gel mixture is generated by mixing a predetermined amount of hydrochloric acid and N-(triethoxysilylpropyl)urea in methanol, thereby generating a solution, and adding a predetermined amount of tetramethyl orthosilicate to the solution, thereby forming a silicon dioxide sol gel. As illustrated in the previous examples, the sol gel mixture may be formulated by adding water to a solution of the alkoxide in an alcohol.

Once the sol gel mixture (including the metal oxides 214) is generated, modified carbon 216 is added thereto such that a suspension of the components is formed. In one embodiment, at least 5 wt % (based on total weight of the suspension) of the modified carbon 216 is added. However, it is to be understood that the weight percent of modified carbon 216 used may vary depending, at least in part, on the processing conditions and the precursors used. Once the components 214, 216 are mixed together, the suspension may be exposed to a combination of stirring and ultrasonic processing. Generally, stirring and ultrasonication may take place at a temperature ranging from about 0° C. to about 100° C.

This suspension is applied to the surface S of the bipolar plate 210 to form the coating 212. In an embodiment, the suspension is applied to the surface S of the bipolar plate 210 by a dipping process. It is to be understood that other application processes may be used, and may be more desirable when generating the coating on a large scale. The requirements of such an application, e.g., the thickness of the coating, may vary according to the individual requirements of the product being coated.

The coating 212 on the bipolar plate 210 is then activated. Activating the coating 212 may be accomplished by drying the suspension coated bipolar plate 210 to form the coating 212, and then immersing the coated bipolar plate 210 in water at a predetermined temperature for a predetermined time. Drying may be accomplished in ambient air for a predetermined amount of time, and then under an elevated temperature for a predetermined amount of time. The elevated temperature is higher than the temperature of the ambient air. This higher temperature may range, for example, from about 80° C. to about 200° C. In an embodiment, the water in which the dried coated plate 210 is immersed has a temperature ranging from about 50° C. to about 100° C. This hot water treatment activates the coating 212 so that it becomes hydrophilic. Specifically, the effect of the hot water treatment is, at least in part, to wash away the remaining chemicals from the pores of the coating, thus rendering the coating 212 hydrophilic. The coating 212 after activation is shown schematically in FIG. 2B.

The activation process removes remaining molecules such as, in a non-limiting example, the acid used in the hydrolysis and the alcohol formed during the hydrolysis process, to generate void space 218 for water adsorption, thereby increasing the wettability. This process also has the effect of activating electron paths 220 (described further hereinbelow) in the coating 212 because the molecules removed are non-conductive molecules on the surface of the modified carbon 216. In contrast, the hydrophilic functional groups on the surface of the modified carbon 216 are not removed during the process because they are chemically bonded to the surface S.

Hydrophilicity is created by means of the sol gel process, the inclusion of the modified carbon 216, and the wet activation process. In some instances, it may be desirable that the coating layer 212 is not calcined at a high temperature, which is often used in traditional approaches for forming porous materials. It has been found that the wet activation process, without calcination, aids in producing porous films 212 with good stability.

The modified carbon 216 is believed to reduce or eliminate the increase of contact resistance, which may be caused by the presence of other metal oxide coating layers. Without being bound to any theory, it is believed that the modified carbon 216 forms electronically conductive paths 220 from the surface S of the bipolar plate 210 to the outer surface of the coating 212. If the bipolar plate 210 is coated with $SiO_2$ or other metal oxide layers, the interface tends to become non-conductive. However, the coating 212 described herein, which includes the modified carbon 216, greatly improves the interfacial conductivity. Therefore, the embodiments disclosed herein enable the application of a highly hydrophilic coating 212 onto the surface S of bipolar metallic plates 210 while maintaining the desired conductivity of the bipolar plates 210.

As shown in FIG. 2B and as previously mentioned, pores 218 for water retention are also formed throughout the activation process. Such pores 218 often form between the modified carbon 216 and the metal oxide 214.

Prior to the coating process, the surface S of the metal bipolar plate 210 may, in some instances, be pre-treated. In one embodiment, the pre-treatment is accomplished by surface-etching with acid, e.g., $H_2SO_4$, to generate a rough and clean surface. In this embodiment, the plate 210 is dipped into a solution of the acid at room or an elevated temperature for a time suitable to achieve the desired surface treatment. The pre-treated surface is then rinsed with water prior to establishing the sol gel mixture thereon.

In another embodiment, the pre-treatment of the surface S of the metal bipolar plate 210 may be accomplished by partially or completely coating the surface S with another, more conductive, metal, e.g., Au, Pt, Cu, Pd, Ni, Al, etc. prior to coating the surface S with the sol gel mixture. An electroplating process or vapor-based processes may be used to apply this conductive metal coating.

The electroplating process uses electrical current to reduce cations of a desired material, typically metal, from a solution and to coat a conductive object (e.g., the surface S) with a thin layer of the other material (in this example, a more conductive metal than the metal of the bipolar plate 210). Specifically, an anode formed by an electrically conducting metal (e.g., Au, Pt, Cu, Pd, Ni, Al, etc.) and a cathode formed by the bipolar plate 210 are both connected to an external supply of direct current while both the anode and cathode are immersed in an electrolyte solution. The anode is connected to the positive terminal of the supply, and the cathode is connected to the negative terminal. When the external power supply is switched on, the metal at the anode is oxidized from the zero valence state to form cations with a positive charge. These cations associate with the anions in the electrolyte solution. The cations are then reduced at the cathode (i.e., the surface S of the plate 210) to deposit an additional conductive layer in the metallic, zero valence state.

As a non-limiting example of this pretreatment process, if the plating metal is copper, the copper is oxidized in an acid solution at the anode to $Cu^{2+}$ by losing two electrons. The $Cu^{2+}$ anion associates with the anion $SO_4^{2-}$ in the solution to form copper sulfate. At the cathode, the $Cu^{2+}$ is reduced to metallic copper by gaining two electrons. The result is the effective transfer of copper from the anode source to form a metal plating layer covering the surface S of the bipolar plate 210.

To further illustrate embodiment(s) of the present disclosure, various examples are given herein. It is to be understood that these are provided for illustrative purposes and are not to be construed as limiting the scope of the disclosed embodiment(s).

EXAMPLES

Example 1

A C—$SiO_2$ coating was formed and applied on a 304 SS (a type of standardized stainless steel) coupon according to the following description.

10.4 g HCl (0.975N, Aldrich) and 21.5 g N-(triethoxysilylpropyl)urea in 50% methanol (United Chemical Tech. Inc.) was added with stirring for 10 minutes at room temperature. 10.4 g tetramethyl orthosilicate (98%, Aldrich) was added into the above solution with continuous stirring for 30 minutes at room temperature. About 42 g of $SiO_2$ sol gel solution was obtained.

6 g of the above sol gel solution and 0.36 g of phenyl sulfonic acid-modified Vulcan XC-72 carbon (the carbon surface having been modified with phenyl sulfonic acid by a standard diazonium chemistry-based procedure) were vigorously stirred together at room temperature for about 30 minutes to form a suspension. The suspension was then put into an ultrasonic batch for 30 minutes at room temperature. Next, the suspension was vigorously stirred for 15 minutes to 30 minutes at room temperature.

A bare 304 SS coupon was then dipped into the suspension. The coated coupon was then dried at room temperature for 2 hours in air. Then the coated coupon was dried at 100° C. in air overnight. Finally the dried coupon was put in water and maintained at 80° C. for at least 4 hours.

Example 2

C—$SiO_2$ suspension samples were made according to the method of Example 1 and at the various concentrations (wt %) listed in Table 1 below. Coupons were coated with the respective suspensions. Each coupon was first tested for hydrophilicity after it was dried, second tested for hydrophilicity after it was water treated, and finally tested for conductivity. For the embodiments disclosed herein, suitable hydrophilicity is obtained when the water contact angle is less than 30°. The specific concentrations on the samples and the results of the tests for each sample are shown in Table 1 below.

TABLE 1

| Coupon | SiO$_2$ Sol Gel (wt %) | Modified C (wt %) | Hydrophilic After Dried? | Hydrophilic After Activation? | Conductive? |
|---|---|---|---|---|---|
| 1 | 99.7 | 0.3 | No | Yes | No |
| 2 | 99.4 | 0.6 | No | Yes | No |
| 3 | 96.9 | 1.1 | No | Yes | No |
| 4 | 98.0 | 2 | No | Yes | No |
| 5 | 94.2 | 5.8 | Yes | Yes | Yes |

Based on these results, it is believed that both the sol gel and the modified carbon contribute to the hydrophilicity of the resulting coating. These results also indicate that at least a minimum weight percentage of modified carbon (which may vary according to process conditions and precursors) is required in order to achieve the desired conductivity.

Example 3

Figure 4:
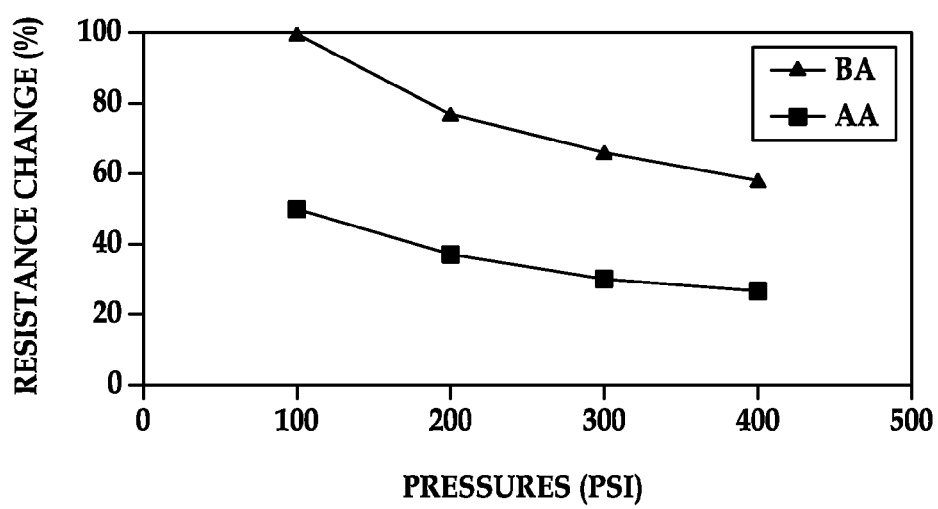
FIG. 4 is a graph comparing the decrease in normalized contact resistance change (%) under increasing pressure (psi) of an embodiment of the coating disclosed herein, where BA reflects the results before activation, and AA reflects the results after activation.

Coupon 5, a C—SiO$_2$ coated coupon including 5.8 wt % modified carbon, described and tested as described above in Example 2 and Table 1, was measured for change in contact resistance as pressure was increased, both after the coupon was dried at 100° C. overnight, (i.e., before activation, BA) and after it was treated in water for 4 hours (i.e., after activation, AA). The graph in FIG. 4 plots the data points which show a definite decrease in resistance (%) for the coupon when the pressure (psi) was increased.

While several embodiments have been described in detail, it will be apparent to those skilled in the art that the disclosed embodiments may be modified. Therefore, the foregoing description is to be considered exemplary rather than limiting.

The invention claimed is:

1. A method of coating a surface of a fuel cell plate, the method comprising:
    forming a sol gel mixture including a metal oxide modified with at least one functional group configured to improve adhesion;
    adding carbon modified with a hydrophilic functional group to the mixture, thereby forming a suspension;
    applying the suspension to the surface of the fuel cell plate; and
    activating the suspension to form a porous, hydrophilic, and conductive film on the surface of the fuel cell plate.

2. The method as defined in claim 1, further comprising pretreating the surface of the fuel cell plate via a surface etching process, an electroplating process, vapor-based processes, or a combination thereof.

3. The method as defined in claim 1 wherein forming the mixture includes generating the sol gel mixture from at least one precursor of the metal oxide, the at least one precursor being a metal alkoxide precursor including the at least one functional group; and wherein the at the least one functional group is selected from the group consisting of amides, acrylics, epoxides, alkylureas, and combinations thereof.

4. The method as defined in claim 1 wherein the mixture is generated by:
    mixing a predetermined amount of hydrochloric acid and N-(triethoxysilylpropyl)urea in methanol, thereby generating a solution; and
    adding a predetermined amount of tetramethyl orthosilicate to the solution, thereby forming a silicon dioxide sol gel.

5. The method as defined in claim 1 wherein the metal oxide present in the metal oxide sol gel mixture is selected from silicon dioxide, titanium dioxide, tin dioxide, tantalum oxide, hafnium dioxide, zirconium dioxide, niobium dioxide, molybdenum oxide, iridium oxide, ruthenium oxide, aluminum oxide, and combinations thereof.

6. The method as defined in claim 1 wherein the hydrophilic functional group is selected from the group consisting of: sulfonic acid groups; phosphoric acid groups; phenyl sulfonic acid groups; OR; COR; COOR; OCOR; COOM; halogens; CN; NR$_2$; SN; SO$_3$H; SO$_3$M; NR(COR); CONR$_2$; NO$_2$; PO$_3$H$_2$; PO$_3$HM; NR$_3^+$X$^-$; and PR$_3^+$X$^-$; where R is independently selected from H, C1-C20 alkyl, or aryl; n is an integer ranging from 1 to 8; M is a metal (Na, K, Li, etc); and X— is a halide anion or an anion derived from a mineral or organic acid; HG(Ar)—, where — represents a bond to a carbon component, HG is a hydrophilic group selected from OR, COR, COOR, OCOR, COOM, halogens, CN, NR$_2$, SN, SO$_3$H, SO$_3$M, NR(COR), CONR$_2$, NO$_2$, PO$_3$H$_2$, PO$_3$HM, NR$_3^+$X$^-$, and PR$_3^+$X$^-$, where R is independently selected from H, C1-C20 alkyl, or aryl; n is an integer ranging from 1 to 8; M is a metal (Na, K, Li, etc); and X— is a halide anion or anion derived from a mineral or organic acid, and Ar is an aromatic group selected from the group consisting of phenyl, napththyl, anthracenyl, phenanthrenyl, biphenyl, pyridinyl, and benzyl; and combinations thereof.

7. The method as defined in claim 1 wherein activating the suspension is accomplished by:
    drying the fuel cell plate having the suspension applied thereto; and
    immersing the dried fuel cell plate in water at a predetermined temperature for a predetermined time.

8. The method as defined in claim 7 wherein drying the fuel cell plate having the suspension applied thereto is accomplished by:
    exposing the fuel cell plate to ambient air for a predetermined amount of time; and
    thereafter exposing the fuel cell plate to a temperature higher than that of the ambient air for an other predetermined amount of time.

9. The method as defined in claim 8 wherein the higher temperature that the fuel cell plate is exposed to ranges from about 80° C. to about 200° C.

10. The method as defined in claim 7 wherein the predetermined temperature of the water ranges from about 50° C. to about 100° C.

11. The method as defined in claim 1 wherein the modified carbon and the modified metal oxide are configured to improve adhesion between the film and the surface of the fuel cell plate.

12. A coating for a fuel cell plate, the coating comprising:
    an activated suspension of a sol gel mixture and carbon modified with a hydrophilic functional group, the sol gel mixture including a metal oxide modified with at least one functional group configured to improve adhesion, and the hydrophilic functional group being selected from the group consisting of: sulfonic acid groups; phosphoric acid groups; phenyl sulfonic acid groups; OR; COR; COOR; OCOR; COOM; halogens; CN; NR$_2$; SN; SO$_3$H; SO$_3$M; NR(COR); CONR$_2$; NO$_2$; PO$_3$H$_2$; PO$_3$HM; NR$_3^+$X$^-$; and PR$_3^+$X$^-$; where R is independently selected from H, C1-C20 alkyl, or aryl; n is an integer ranging from 1 to 8; M is a metal (Na, K, Li, etc); and X— is a halide anion or an anion derived from a mineral or organic acid; HG(Ar)—, where — represents a bond to a carbon component, HG is a hydrophilic group selected from OR, COR, COOR, OCOR, COOM, halogens, CN, $NR_2$, SN, $SO_3H$, $SO_3M$, NR(COR), $CONR_2$, $NO_2$, $PO_3H_2$, $PO_3HM$, $NR_3^+X^-$, and $PR_3^+X^-$, where R is independently selected from H, C1-C20 alkyl, or aryl; n is an integer ranging from 1 to 8; M is a metal (Na, K, Li, etc); and X- is a halide anion or anion derived from a mineral or organic acid, and Ar is an aromatic group selected from the group consisting of phenyl, napththyl, anthracenyl, phenanthrenyl, biphenyl, pyridinyl, and benzyl; and combinations thereof.

13. The coating as defined in claim 12 wherein the sol gel mixture is formed from at least one precursor of the metal oxide, the at least one precursor being a metal alkoxide precursor including the at least one functional group; and wherein the at the least one functional group is selected from the group consisting of amides, acrylics, epoxides, alkylureas, and combinations thereof.

14. The coating as defined in claim 12 wherein the metal oxide is selected from silicon dioxide, titanium dioxide, tin dioxide, tantalum oxide, hafnium dioxide, zirconium dioxide, niobium dioxide, molybdenum oxide, iridium oxide, ruthenium oxide, aluminum oxide, and combinations thereof.

15. The coating as defined in claim 12 wherein the coating is porous.

16. The coating as defined in claim 12 wherein the modified carbon is configured to improve hydrophilicity and conductivity of the coating.

17. A fuel cell, comprising:
an electrode;
a bipolar plate proximate to the electrode; and
a film established on the bipolar plate, the film including an activated suspension of a sol gel mixture and carbon modified with a hydrophilic functional group, the sol gel mixture including a metal oxide modified with at least one functional group configured to improve adhesion, and the hydrophilic functional group being selected from the group consisting of: sulfonic acid groups; phosphoric acid groups; phenyl sulfonic acid groups; OR; COR; COOR; OCOR; COOM; halogens; CN; $NR_2$; SN; $SO_3H$; $SO_3M$; NR(COR); $CONR_2$; $NO_2$; $PO_3H_2$; $PO_3HM$; $NR_3^+X^-$; and $PR_3^+X^-$; where R is independently selected from H, C1-C20 alkyl, or aryl; n is an integer ranging from 1 to 8; M is a metal (Na, K, Li, etc); and X— is a halide anion or an anion derived from a mineral or organic acid; HG(Ar)—, where — represents a bond to a carbon component, HG is a hydrophilic group selected from OR, COR, COOR, OCOR, COOM, halogens, CN, $NR_2$, SN, $SO_3H$, $SO_3M$, NR(COR), $CONR_2$, $NO_2$, $PO_3H_2$, $PO_3HM$, $NR_3^+X^-$, and $PR_3^{+X^-}$, where R is independently selected from H, C1-C20 alkyl, or aryl; n is an integer ranging from 1 to 8; M is a metal (Na, K, Li, etc); and X— is a halide anion or anion derived from a mineral or organic acid, and Ar is an aromatic group selected from the group consisting of phenyl, napththyl, anthracenyl, phenanthrenyl, biphenyl, pyridinyl, and benzyl; and combinations thereof.

18. The fuel cell as defined in claim 17 wherein the sol gel mixture is formed from at least one precursor the metal oxide, the at least one precursor being a metal alkoxide precursor including the at least one functional group; and wherein the at the least one functional group is selected from the group consisting of amides, acrylics, epoxides, alkylureas, and combinations thereof.

19. The fuel cell as defined in claim 17 wherein the metal oxide is selected from silicon dioxide, titanium dioxide, tin dioxide, tantalum oxide, hafnium dioxide, zirconium dioxide, niobium dioxide, molybdenum oxide, iridium oxide, ruthenium oxide, aluminum oxide, and combinations thereof.

20. The fuel cell as defined in claim 17, further comprising:
an other electrode;
an other bipolar plate proximate to the other electrode;
an other film established on the other bipolar plate, the other film including an activated suspension of a sol gel mixture and carbon modified with a hydrophilic functional group, the sol gel mixture including a metal oxide modified with at least one functional group configured to improve adhesion, and the at least one hydrophilic functional group being selected from the group consisting of: sulfonic acid groups; phosphoric acid groups; phenyl sulfonic acid groups; OR; COR; COOR; OCOR; COOM; halogens; CN; $NR_2$; SN; $SO_3H$; $SO_3M$; NR(COR); $CONR_2$; $NO_2$; $PO_3H_2$; $PO_3HM$; $NR_3^+X^-$; and $PR_3^+X^-$; where R is independently selected from H, C1-C20 alkyl, or aryl; n is an integer ranging from 1 to 8; M is a metal (Na, K, Li, etc); and X— is a halide anion or an anion derived from a mineral or organic acid; HG(Ar)—, where— represents a bond to a carbon component, HG is a hydrophilic group selected from OR, COR, COOR, OCOR, COOM, halogens, CN, $NR_2$, SN, $SO_3H$, $SO_3M$, NR(COR), $CONR_2$, $NO_2$, $PO_3H_2$, $PO_3HM$, $NR_3^+X^-$, and $PR_3^+X^-$, where R is independently selected from H, C1-C20 alkyl, or aryl; n is an integer ranging from 1 to 8; M is a metal (Na, K, Li, etc); and X— is a halide anion or anion derived from a mineral or organic acid, and Ar is an aromatic group selected from the group consisting of phenyl, napththyl, anthracenyl, phenanthrenyl, biphenyl, pyridinyl, and benzyl; and combinations thereof; and
an electrolyte in electrochemical contact with each of the electrode and the other electrode.

* * * * *